United States Patent [19]
Yamamoto et al.

[11] 3,816,730
[45] June 11, 1974

[54] ELECTRONIC CALCULATOR WITH AN INCORPORATED DIGITAL CLOCK

[75] Inventors: Mititaka Yamamoto; Fumio Hayakawa, both of Kyoto, Japan

[73] Assignee: Omron Tateisi Electronics Co., Kyoto, Japan

[22] Filed: Oct. 4, 1972

[21] Appl. No.: 294,771

[30] Foreign Application Priority Data
Oct. 4, 1971 Japan ............................... 46-77759

[52] U.S. Cl. ................ 235/156, 58/50 R, 58/152 R
[51] Int. Cl. .......................... G06f 7/48, G04b 47/00
[58] Field of Search ........... 235/156, 152; 58/152 R, 58/50 R

[56] References Cited
UNITED STATES PATENTS

| | | | |
|---|---|---|---|
| 3,546,696 | 12/1970 | Waters et al. | 235/152 X |
| 3,610,902 | 10/1971 | Rahenkamp et al. | 235/152 |
| 3,646,751 | 3/1972 | Purland et al. | 58/50 R X |
| 3,653,204 | 4/1972 | Miwa | 58/42.5 |

*Primary Examiner*—Malcolm A. Morrison
*Assistant Examiner*—David H. Malzahn
*Attorney, Agent, or Firm*—Craig & Antonelli

[57] ABSTRACT

An electronic calculator incorporated with a digital clock, which comprises an arithmetical calculating section, a digital clock section, a display section which is commonly used for displaying the result of arithmetic calculation performed by the calculating section and for displaying the time information yielded by the clock section and a switch for selectively bringing one of the sections into operation to permit the calculator to function as either a calculator or a clock in response to the operation of the switch.

1 Claim, 5 Drawing Figures

ELECTRONIC CALCULATOR WITH AN INCORPORATED DIGITAL CLOCK

This invention relates to a calculating apparatus, and more particularly to an electronic calculator with an incorporated digital clock.

In recent years, electronic calculators have come into considerable use, both for household and office use. In office work, it is often necessary to know the time required to perform an arithmetic calculation by the calculator. Prior to this invention, a separate precision clock was used in cooperation with the calculator. This was found to involve difficulties in adjustment as well as being quite expensive.

It is an object of the present invention to overcome these disadvantages inherent in conventional devices by providing a calculator which has incorporated facilities for the generation of timing signals as well as being able to carry out the arithmetical operation of addition, subtraction, multiplication and division, and in which a user can obtain read-out of numerical values indicating either time or results of the arithmetic operation on a common display unit any time he wishes. The device of this invention thus makes for convenience of use and adds to the functions of calculating machines.

Figure 1:
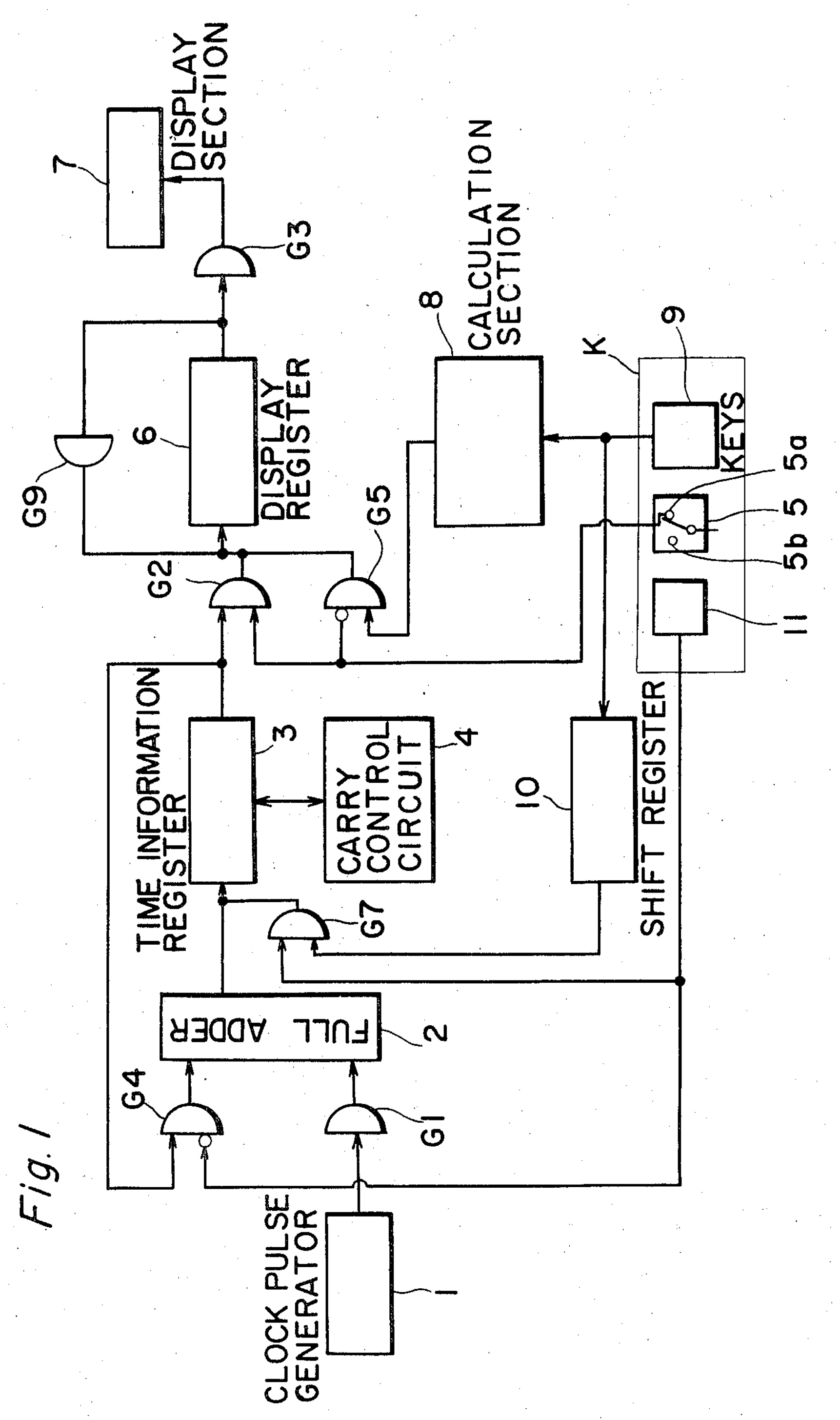
Figure 2:
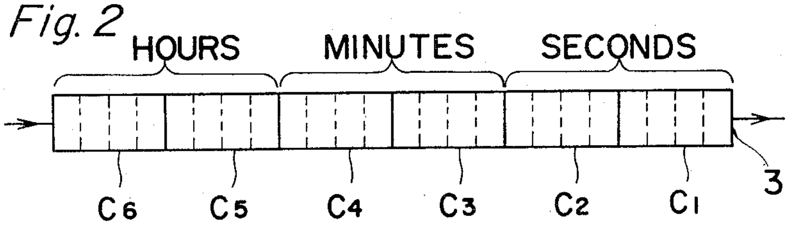
Figure 3:
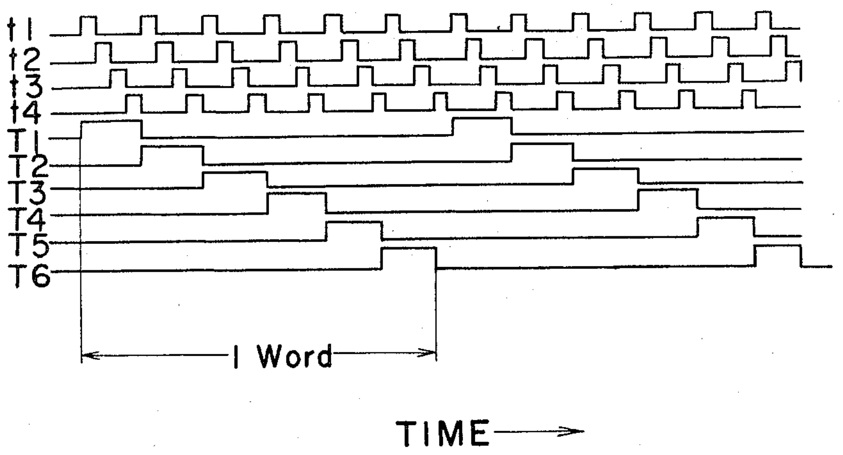
Figure 4:
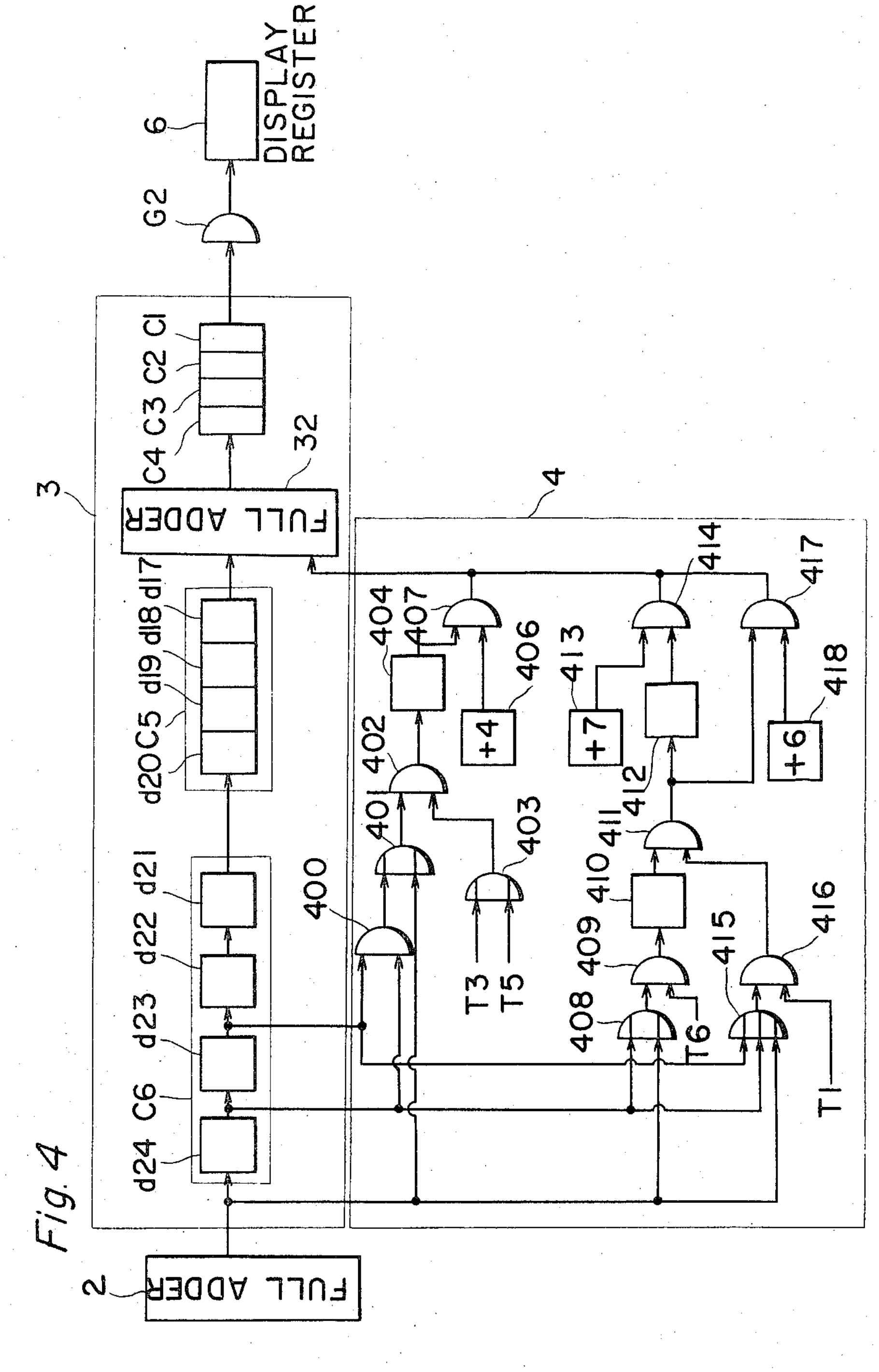
Figure 5:
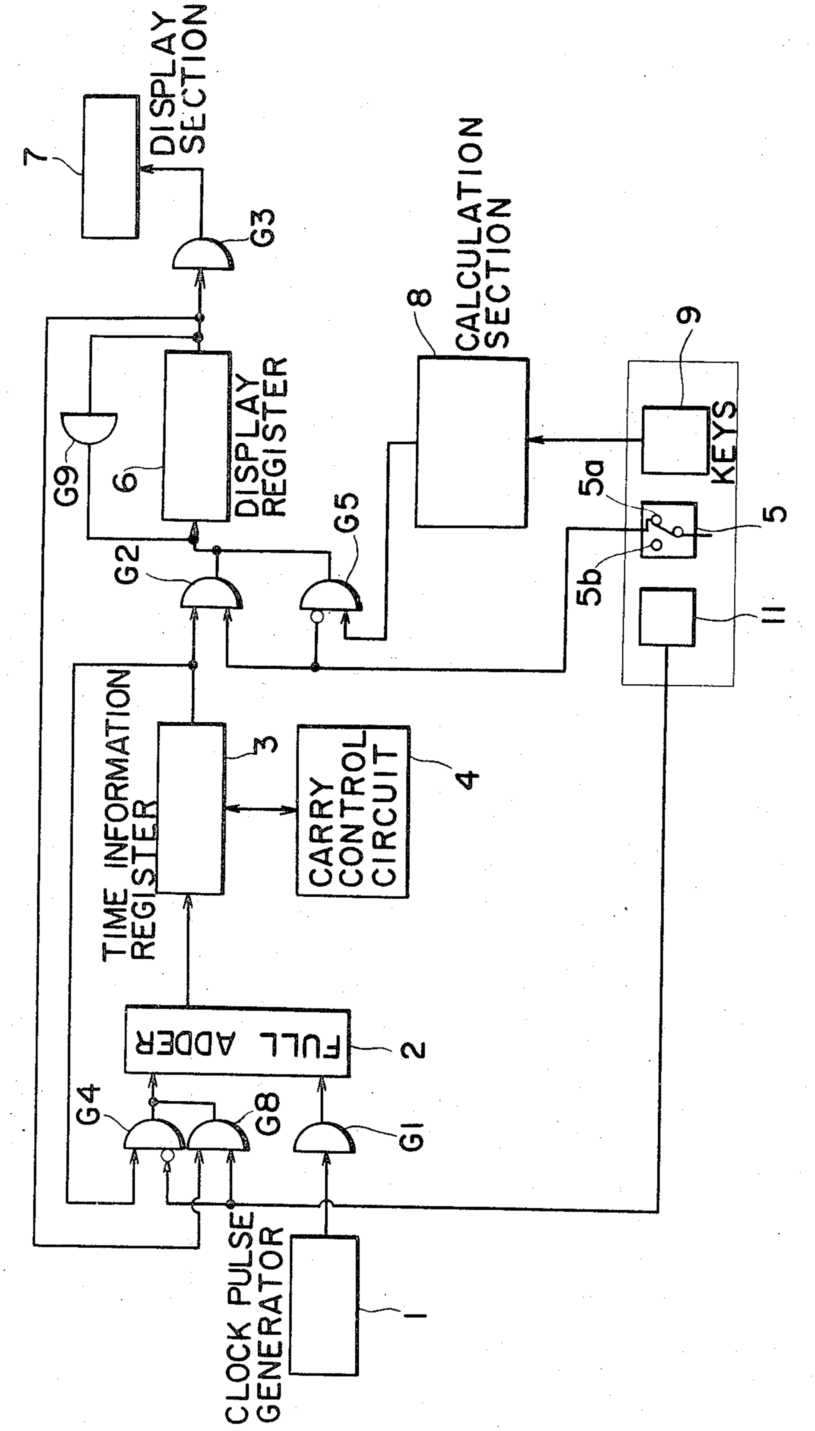

This and other objects and features of present invention will become apparent from the following description taken in conjunction with one preferred embodiment and with reference to the attached drawings, in which:

FIG. 1 is a block circuit diagram of an embodiment of the present invention,

FIG. 2 is an explanatory drawing of the time information register employed in the embodiment shown in FIG. 1, FIG. 3 is a schematic diagram showing waveforms of various timing pulses employed in the present invention, FIG. 4 is a logical circuit diagram of a time information register and a carry control circuit employed in the embodiment shown in FIG. 1, and FIG. 5 is a block circuit diagram of another embodiment of the present invention.

Before the description of the present invention proceeds, it is to be noted that, for the sake of brevity, like parts are designated by like reference numerals throughout the several views of the accompanying drawings. It is also to be noted that the concept of the present invention as well as the application thereof can be applied other than the electronic calculator, for example, to a cash register or the like.

In FIG. 1, an output terminal of a clock pulse generator 1 for generating a pulse train of which frequency is 1 Hz is connected to one input terminal of a full adder 2 through an gate G1. An output terminal of the full adder 2 is connected to a time information register 3 of which output terminal is connected to another input terminal of the full adder 2 through an inhibit gate G4.

The time information register 3 is a shift register of dynamic type comprising stages C1, C2, C3, C4, C5 and C6 each having 4 bits as shown in FIG. 2, which store binary coded signals representative of the time information of the seconds, minutes and hours value.

In this embodiment, the time information are designated in such a manner that each value of the hours, minutes and seconds is expressed within a two decimal digit frame work, for example, 12 o'clock, 34 minutes and 56 seconds and the first place of each hours, minutes and seconds value means, in the case of above example, the place in which the numbers 2, 4 and 6 are present, respectively, and the second place of each value means the place in which the numbers 1, 3, 5 are present, respectively.

As is well known by those skilled in the art, the dynamic shift register is designed such that binary coded digits to be stored therein are circulated therethrough in succession in response to bit timing pulses $t1$, $t2$, $t3$ and $t4$ and digit timing pulses T1, T2, . . . T6 emerging from a timing pulse generator (not shown).

At a timing $T1 \cdot t1$, the binary coded signal of the first and second places of the seconds value of a time information is stored in the stages C1 and C2, the first and second places of the minutes value in the stages C3 and C4 and the first and second places of the hours value in the stages C5 and C6. However, it is to be noted that the timing $Ti \cdot tj$ is designated as to represent a period during which a digit timing pulse $Ti$ and a bit timing pulse $tj$ (wherein $i = 1, 2, \ldots, 6$ and $j = 1, 2, 3$ and 4) are present.

The outputs of the time information register 3 are applied through the inhibit gate G4 to the input terminal of the full adder 2, so that the binary coded signals stored in the register 3 are kept circulating for the dynamic memory allocation.

In the arrangement of the above mentioned, a value [1] is cumulatively added to the value of the time represented by the signals fed from the time information register 3 each time when a pulse is applied to the full adder 2 from the clock pulse generator 1. Accordingly, the output value of the full adder 2 increases value [1] every second, and as a result this output value is indicative of the total number of time counts in second.

The output of the time information register 3 is applied through a gate G2 to an input terminal of a display register 6 which is a shift register of dynamic type and stores binary coded signals representative of the time.

The outputs of the display register 6 are applied through an gate G3 to a display section 7 which is disposed on the desk top calculator and comprises a plurality of a digital display tubes arranged so as to display numeric characters zero through nine corresponding to the content stored in the display register 6.

The input terminal of the display register 6 also recieves signals fed from a calculation section 8 through an inhibit gate G5. The calculation section may be of the same construction as the calculation section of the conventional electronic desk top calculator and comprises a circuit controlled by the signals representative of operation of the keys such as numeric keys and/or function keys, operably provided on the key-board K of the calculator. This calculation section carries out arithmetical operations in the known manner.

A change-over switch 5 of the push button and the lock type is operably provided in the keyboard section K to change-over between the operations of the clock and calculator.

An output signal of the contact **5*a* of the change over switch 5, which is generated when said switch 5 is changed over or locked to the clock side 5*a* as shown in FIG. 1, is applied to the terminal of the AND gate G2 so as to open the gate G2, thereby to permit the binary coded signals indicative of any given time to pass from the time information register 3 to the display register 6. Accordingly, when the change-over switch 5** is changed over to the clock side *5a*, the register 6 stores the signals representing the time and the display section 7 displays a series of the numeric characters indicative of a given time. And, when the change-over switch 5 is changed over to the calculation side *5b*, the display register 6 receives the signals fed from the calculation section 8 whereby the display section 7 displays the numeric characters which represent arithmetic result or entry entered from the keys 9.

A carry control circuit 4 is provided in order to detect the storage content of the time information register 3 constantly so as to effect and control carry operations from one column to another in the stages C1–C6 of the time information register 3.

FIG. 4 shows a logical block diagram of the details of the time information register 3 and the carry control circuit 4, which will be hereinafter described.

In this logical circuit diagram of FIG. 4, reference numerals 400 and 401 designate AND gate and OR gate, respectively, which are provided for detecting whether the value stored in any one of bits of the time information register 3 has exceeded a decimal number [6]. The AND gate 400 has a pair of input terminals which are connected with input terminals of respective cells d23 and d22 of the sixth stage C6 of the time information register 3. In the sixth stage C6 of the time information register 3, the cells *d*21, *d*22, *d*23 and *d*24 are adapted to store informations in the $2^0$'s, $2^1$'s, $2^2$'s and $2^3$'s positions, respectively. Accordingly, the AND gate 400 will generate a high level signal 1 when the value stored in the sixth stage C6 of the time information register 3 becomes [6] or [7]. The OR gate 401 has a pair of input terminals, one of which is connected with the output terminal of the AND gate 400 and the other of which is adapted to receive a signal from the input terminal of the cell *d*24, whereby it will generate a high level signal 1 when the decimal value stored in the sixth stage C6 of the time information register 3 becomes or exceeds [6]. In view of this, it is clear that generation of the high level signal 1 from the OR gate 401 indicates that the decimal value stored in the sixth stage C6 of the time information register 3 exceeds [6].

Reference numerals 402 and 403 designate AND gate and OR gate, respectively, which are provided for determining whether the decimal value in any place of the time values associated with hours, minutes and seconds exceeds [6] and for determining whether the detected decimal value is associated with the minutes or the seconds.

In the logical block diagram of FIG. 2, assuming that the time value is stored in the time information register 3 during the timing T1, the time value thus stored will be shifted one place rightwards during the subsequent timing T2. During the timing T3, the time value thus stored will be further shifted one place rightwards. Accordingly, during the timing T3, the second place of the seconds value can be stored in the stage C6. Similarly, during the timing T5, the second place of the minutes value can be stored in the sixth stage C6.

The AND gate 402 has a pair of input terminals, one of which is connected with the output terminal of the OR gate 401 and the other of which is connected with the output terminal of an OR gate 403. The OR gate 403 has a pair of input terminals which are respectively adapted to receive specific timing signals T3 and T5 so that, when the decimal value stored in the sixth stage C6 during the timing T3 or T5, the AND gate 402 can generate a high level signal 1. Generation of this high level signal 1 during the timing T3 and the timing T5 respectively indicates the attainment of the time value exceeding 60 seconds and 60 minutes.

Reference numeral 404 designates a delay circuit for delaying the output from the AND gate 402 for a period corresponding to the duration of one digit timing signal. By way of example, if the AND gate 402 generates a high level signal 1 during the timing T3, i.e., if the 60 seconds have elapsed, this high level signal can be stored in the delay circuit 404 during the timing T4 and emerges from the output terminal thereof during the timing T5.

Reference numerals 406 and 407 respectively designate a generator for signals indicative of a decimal number [4] and an AND gate, which are provided for supplying to one of the input terminals of the full adder 32 a signal representative of a decimal number [4] which is complemental to the decimal number [6] when the high level signal 1 is generated from the output terminal of the delay circuit 404.

The AND gate 407 has a pair of input terminals, one of which is connected with the output terminal of the delay circuit 404 and the other of which is connected with the output terminal of the complemental signal generator 406. Although the complemental signal generator 406 generates a complemental signal indicative of a decimal number [4] in response to each of the digital timing signals, emergence from the output terminal of the AND gate 407 is when the high level signal 1 is applied from the delay circuit 404 to one of the input terminals of the AND gate 407.

When the seconds value is detected as exceeding 60 seconds during the timing T3, the output from the delay circuit 404 will become a high level signal during the timing T5 and the complemental signal can be then supplied to said one of the input terminals of the full adder 32 through the AND gate 407. On the other hand, the decimal number [6] in the second place of the seconds value stored in the sixth stage C6 of the time information register 3 during the timing T3 can be supplied to the other input terminal of the full adder 32 through the fifth stage C5 during the timing T5. The full adder 32 acts then to add the decimal number [4] to the decimal number [6] to produce the sum of a decimal number [10]. The first place of these decimal digits of the decimal number [10] can be stored in the fourth stage C4 during the timing T5 while the second place thereof can be stored in the fourth stage C4 during the timing T6 and, during the subsequent timing T1, the stages C2 and C3 stores decimal digits [0] and [1], respectively. This accounts for that carry-over from 60 seconds to 1 minute takes place to designate the content stored in the register 3 being "one minute zero second." Carry-over from 60 minutes to 1 hour can be performed in a similar manner as hereinabove described.

Reference numerals 408 and 409 respectively designate OR gate and AND gate, which are provided for detecting whether the first place of the hours value of the time information exceeds a decimal number [4] when it is stored in the sixth stage C6 of the time information register 3. The OR gate 408 has a pair of input terminals, one of which is connected with an input terminal of the cell *d*23 and the other of which is connected with an input terminal of the cell *d*24, whereby it will generate a high level signal 1 when the content stored in the sixth stage C6 of the time information register 3 exceeds a decimal number [4]. The AND gate 409 has a pair of input terminals, one of which is connected with the output terminal of the OR gate 408 and the other of which is adapted to receive a timing signal T6. The timing at which the AND gate 409 generates the high level signal 1 is during the timing T6 and when the decimal value stored in the sixth stage C6 exceeds a decimal number [4]. Generation of this high level signal from the AND gate 409 indicates that the first place of the hours value of the time information is greater than the decimal number [4].

Reference numeral 410 designates a delay circuit for delaying the output from the AND gate 409 for a period corresponding to the duration of one digit timing signal.

Reference numerals 415 and 416 designate an OR gate and an AND gate, which are provided for detecting whether the second place of the hours value of the time information is greater than a decimal number [2]. The OR gate 415 has three input terminals which are respectively connected with the input terminals of the cells d22, d23 and d24, and acts to generate a high level signal 1 when the decimal value stored in the sixth stage C6 of the time information register 3 exceeds a decimal number [2]. The AND gate 416 has a pair of input terminals, one of which is connected with the output terminal of the OR gate 415 and the other of which is adapted to receive a timing signal T1. The timing at which the AND gate 416 generates the high level signal is during the timing T1 and when the decimal value stored in the sixth stage C6 exceeds a decimal number [2]. Generation of the high level signal from the AND gate 416 accounts for that the second place of the hours value of the time information is greater than the decimal number [2].

When the high level signal 1 is generated from the AND gate 409 during the timing T6, this high level signal is then fed to the delay circuit 410 whereby it can be delayed a period corresponding to the duration of one digit timing signal. However, during the subsequent timing T1, the delay circuit 410 can generate a high level signal 1.

Reference numeral 411 designates an AND gate for detecting whether the hours value of the time information represents the 24th o'clock. This AND gate 411 has a pair of input terminals, one of which is connected with the output terminal of the delay circuit 410 and the other of which is connected with the output terminal of the AND gate 416. When the first and second places of the hours value of the time information become [4] and [2], respectively, the both input terminals of the AND gate 411 receive high level signals whereby a high level signal 1 can be generated from the output terminal of said AND gate 411 during the timing T1. As hereinabove described, generation of the high level signal "1" from the AND gate 411 accounts for that the hours value of the time information represents the 24th o'clock.

Reference numerals 417 and 418 designate an AND gate and a signal generator for generating a binary coded signal indicative of a decimal digit [6], respectively, which are provided for supplying a signal to the full adder 32 which is necessary to add a decimal digit [6] to the first place of the hours value of the time information when said hours value becomes greater than [24]. The AND gate 417 has a pair of input terminals, one of which is connected with the output terminal of the AND gate 411 and the other of which is connected with the signal generator 418.

Reference numerals 412, 413 and 414 are a delay circuit, a signal generator for generating a binary coded signal indicative of a decimal digit [7] and an AND gate, respectively, which are provided for supplying a signal to the full adder 32 which is necessary to add a decimal digit [7] to the second place of the hours value of the time information when said hours value becomes greater than [24]. The delay circuit 412 has an input terminal connected with the output terminal of the AND gate 411 and an output terminal connected with one of the input terminals of the AND gate 414. The other input terminal of the AND gate 414 is connected with the output terminal of the signal generator 413.

When the high level signal 1 which indicates that the hours value of the time information exceeds the decimal number [24] emerges from the output terminal of the AND gate 411 during the timing T1, it can be then fed to one of the input terminals of the AND gate 417 so that the signal indicative of the decimal digit [6] which is generated by the generator 418 can be applied to the other input terminal of the full adder 32 through the AND gate 417. This takes place during the timing T1. On the other hand, since the one of the input terminals of the full adder 32 receives a signal indicative of the decimal digit [4] of the first place of the hours value of the time information fed from the fifth stage C5 of the register 3 during the timing T1, the decimal digits [4] and [6] both fed to the full adder 32 can be added by said adder 32 to produce a signal indicative of the decimal sum [10] through said adder 32. The digit [0] in the first place of this decimal sum can be stored in the fourth stage C4 during the timing T2 and the digit [1] in the second place thereof can be shifted.

The high level signal 1 fed to the delay circuit 412 from the AND gate 411 during the timing T1 can emerge from the output terminal of said delay circuit 412 during the subsequent timing T2 after having been delayed a period corresponding to the duration of one digit timing signal, which is subsequently applied to one of the input terminals of the AND gate 414. Accordingly, the signal indicative of the decimal digit [7] which has been generated from the signal generator 413 can be applied to the other input terminal of the full adder 32 through said AND gate 414 during the timing T2.

On the other hand, the signal indicative of a decimal number [2] in the second place of the hours value stored in the fifth stage C5 can be applied to the other input terminal of the full adder 32 during the same timing, i.e., during the timing T2, whereby the full adder 32 acts to add these decimal digits to produce a signal indicative of the sum [10]. Of these digits of the decimal sum [10], the digit [0] in the first place can be stored in the fourth stage C4 during the timing T3 while the digut [1] in the second place can be cut down or omitted. As a result thereof, the contents stored in the fifth and sixth stages C5 and C6 during the timing T1 are zero and zero, respectively, which means the zero o'clock.

In the calculator with a digital clock according to the present invention, it is necessary that the time displayed is set to a correct time. To facilitate the setting of the time displayed to the correct time, the numeric signals of numeric key portion 9 are adapted to be fed to a shift register 10 which consists of 24 bits of which output signals are applied to one input terminal of an AND gate G7. Another input terminal of the AND gate G7 receives signals fed from a correction key switch 11 which is provided manually operably in the keyboard K. Said correction key switch 11 is operated when an operator of the device intends to correct the time to be displayed. One of outputs of the correction key switch 11 is adapted to be fed to the inhibit input terminal of the inhibit gate G4 to inhibit the circulation of the contents stored in the time information register 3 so as to clear off the contents of the register 3.

In this arrangement, if it is necessary to correct the time to be displayed, for example, 1 o'clock, 23 minutes and 45 seconds; the numeric keys (1), (2), (3), (4) and (5) on the keyboard are successively operated, and a series of the binary code signals indicative of the time to be set are fed to the shift register 10 and stored therein. On the other hand, upon operation of the correction key 11, the inhibit gate G4 closes whereby the contents stored in the time information register 3 are cleared off. After the contents stored in the register 3 are cleared off, the contents stored in the register 10 are applied at a suitable timing, which is decided by the digit and bit timing pulses, to the time information register 3 through the AND gate G7 which is opened by the application of the signal fed from the correction key switch 11, then the contents indicative of the correct time are stored in the time information register 3 whereby the display section 7 can displays the correct time, i.e., 1 o'clock, 23 minutes, 45 seconds.

In this operation, it is to be noted that the period of time during which the AND gate G7 should open is determined such that the contents stored in the register 10 are completely transferred to the time information register 3. Accordingly, the correction key switch 11 may be a self-return type, namely the closure of the key switch 11 is held only while the key depressed, since the period required for the transfer of the contents stored in the register 10 to the time information register 3 is shorter than the period of the closure of the key switch 11 by the manual operation.

After the signal at the inhibit terminal of the inhibit gate G4 diminishes in response to the release of the correction key 11, for example, the inhibit gate G4 opens and permits to pass the new contents of the time register 3 therethrough whereby the contents are recirculated and stored in the time information register 3. In addition, the contents are increased by per second as hereinbefore described.

Although the construction of the electronic calculator of the present invention has been described, it should be noted that the various gates employed in the embodiment are adapted to be controlled so as to transfer each binary coded signal in response to the timing signal T1, T2, . . . , and $t1$, $t2$, $t3$ and $t4$. However, those operations are well known by those skilled in the art and, therefore, the details thereof are herein omitted.

Description of an example of this device will be made hereinafter.

If the timing key 5 is locked and changed over to the clock side 5*a*, the contents of the time information register 3 are applied through the gate G2 to the display register 6, and thence to the display section 7, where the time is displayed. On the other hand, the inhibit gate G5 closes by the presence of the signal fed from the contact 5*a* of the timing key switch 5 to the inhibit gate G5.

In this example, it is assumed that the initial condition of the contents of the time information register 3 are (0), namely, the contents thereof means 0 o'clock, 0 minutes and 0 seconds. The contents of the time information register 3 are circulated through the inhibit circuit G4 and the full adder 2. On the other hand, the clock pulses from the clock pulse generator 1 are applied at the rate of one per second through the gate G1 to the full adder 2. When one clock pulse is applied to the full adder 2, the value of first place of the second value of the contents are increased by [1], then the contents stored in the stages C6 to C1 of the time information register 3 are (0000) (0000), (0000) (0000) and (0000) (0001), respectively.

Although the contents flowing the respective registers and other circuits are in the binary form, in order to simplify the description, the contents of the various circuits are hereinbefore expressed in decimal form.

The contents (00000 and 1) stored in the time information register 3 are circulated through the full adder 2 and while in the full adder 2, the value of the first place of the seconds value of the time information increases cumulatively each time the clock pulse is applied, thus the contents stored the time information register 3 increase at the rate of one per second.

The contents stored in the time information register 3 are transferred to the display register 6 through the gate G2 and the contents are in turn fed to the display section 7, the value of which contents fed to said register 6 change second by second while being displayed in the digital form.

If it is desired to adjust the time to be displayed to a correct time such as 1 o'clock, 23 minutes and 45 seconds, this is achieved by operating numeric keys of [1], [2], [3], [4] and [5] and the correction key 11, which is released instantly. Incident to the operation of the correction key 11, the contents stored in the time information register 3 are cleared off since the inhibit gate G4 inhibits the circulation of the contents because of the presence of the inhibit signal at the inhibit terminal of the gate G4. While the new contents (01234 and 5) that have been entered from the numeric keys are applied to the time information register 3 through the shift register 10 and the AND gate G7 and are stored in the register 3.

The correct value of the time described above is stored in the time information register 3, the content (01234 and 5) being circulated from the time information register 3 and back to said register 3 through the inhibit gate G4, which is already opened, and the full adder 2, and the corresponding value (012345) is displayed as the time 1 o'clock, 23 minutes and 45 seconds at the display section 7. The value for time in the time information register 3 increases cumulatively at the rate of one a second.

On the other hand, the contents stored in the time information registers 3 are carried up to the upper place by the operation of the carry control circuit 4 each time the seconds, minutes and/or hours value becomes or exceeds the value [60] and [24] respectively as hereinbefore described.

As mentioned above, the electronic calculator according to the present invention can be used as a digital clock.

If the key associated with the change over switch 5 is unlocked and changed over to the calculation side 5b, the gate G2 is closed and the contents stored in the display register 6 are cleared off in the known manner, such as by closing the circulation gate G9 in response to the operation of the clear key (not shown). Then, the time that has been displayed disappears, and the calculating section 8 can be brought into operation by means of the keys 9 on the keyboard K to carry out various arithmetical operations. The values obtained are successively stored in the display register 6 through the inhibit gate G5 that has been opened and displayed at the display section 7 during the course of calculation.

The contents stored in the time information register 3 also change with time during these calculations and if the timing key 5 is locked again, time is again displayed at the display section 7, starting from the time when the key was locked.

According to the present invention, the apparatus can be used for measuring the time required in performing some arithmetic operations. In this case, prior to setting the device so as to function as a calculator, the contents stored in the time information register 3 must be cleared off and, after the arithmetic operations are completed or part way through such an arithmetic operation, the device must be again set to function as a clock, with the time required for performing the arithmetic operations being displayed by the display section.

In the above example the pulse repetition frequency of signals from the clock pulse generator was taken as 1 Hz, which, however, is not the only possible value; for example, a 60 Hz pulse can be applied to the full adder 2, in whch case it is possible to ascertain the time to within one-sixtieth of a second.

The display unit 7 is for display both of values indicating time and of values indicating results of calculations; it is possible, however, to incorporate a separate display unit driving circuit and obtain direct display of the contents of the time register 3.

FIG. 5 shows another embodiment of the present invention in which the shift register 10 of the previous embodiment shown in FIG. 1 is omitted and the display register 7 is adapted to store the signals indicative of of correct time entered from the keys 9. In addition, an AND gate G8 are provided to pass through the contents stored in the display register 6 for circulation. When the correction key associated with the correction key switch 11 is operated, the signal of the correction key switch 11 is applied to the inhibit gate G4 and the gate G8, then the inhibit gate G4 is brought into the inhibit condition thereby to clear the contents that have been stored in the time informtion register 3. On the other hand, the contents stored in the display register are transferred to the time information register 3 whereby the new contents are stored therein as the amended time information.

Also the display unit need not only use a photoemissive diode or numeric display tube, but is equally well adapted to use with a printer, etc.

As can be understood from the explanation of the above example the device of the present invention functions both as a clock and as a calculator, it being possible to switch over from one function to the other at any time the user or operator wishes, and at any time to ascertain the time taken by a calculation.

Moreover, the display unit, display unit driving circuit and the power supply are common to both functions with the result that this device is considerably cheaper and more compact than conventional devices simply making joint use of separate calculators and time pieces.

Although in the foregoing embodiment the change-over switch 5 has been described as of the lock type, it may be of a self-return type. In this case, the switch must be maintained in the closed position by pressing a push button therefor during a period in which the device of the present invention is desired to function as a clock. Alternatively, a combined use of the self-return type switch and one-shot multivibrator circuit can be contemplated. In such case, the one-shot multivibrator circuit is effective to hold the output signal generated upon closure of the change-over switch to permit the gates G2 and G5 to be opened and closed, respectively, in response to the output signal from said one-shot multivibrator circuit so that, during the duration of said output signal from said one-shot multivibrator circuit, the device of the present invention can function as a clock.

What is claimed is:

1. An electronic apparatus operating as a calculator or digital clock comprising means for generating clock pulses of a predetermined frequency, a first register for storing time information, a full adder having one input terminal connected to an output of said means for generating clock pulses and another input terminal connected to an output of said first register, said full adder having an output terminal connected to an input of said first register such that the contents of said first register is added to the output of said means for generating clock pulses by said full adder with the result stored in said first register in the form of time information, a keyboard having a plurality of numeric keys representing decimal numbers zero through nine and a plurality of function keys, a calculator section being connected to said keyboard for generating arithmetic information which is indicative of the result of an arithmetic operation performed in accordance with the operation of said numeric keys and function keys on said keyboard, a second register for storing either the time information that has been stored in said first register or the arithmetic information, switch means disposed in said keyboard for generating an electric signal which is utilized to selectively switch the electronic apparatus to function as either a calculator or a clock, gate means controlled in response to said electric signal from said switch means to feed the time information stored in said first register or the arithmetic information result of said calculator section to said second register, means for displaying the content stored in said second register in the digital form, a correction key switch disposed in said keyboard for adjusting the currently displayed time to a correct time, means for clearing the time information stored in said first register in response to a signal generated upon closure of said correction key switch and means operable in response to said signal generated upon closure of said correction key switch to feed a new time information to said first register which is to be displayed through said displaying means as the correct time upon operation of said correction key switch.

* * * * *